May 16, 1933.  M. F. CONNELL  1,908,692
NONSKID ATTACHMENT FOR AUTOMOBILES
Filed Oct. 10, 1931
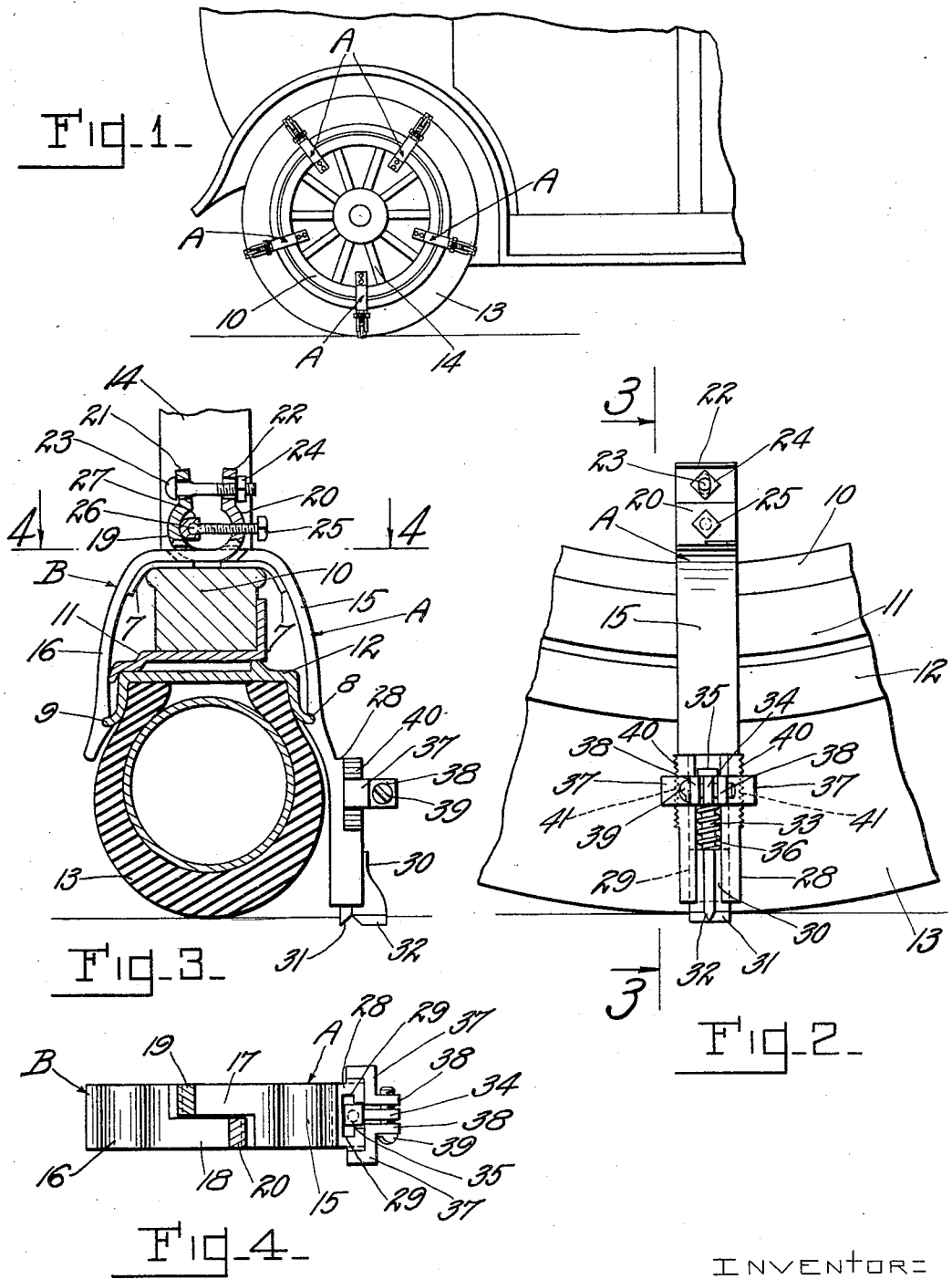
INVENTOR:
Martin F. Connell
By Macleod, Calver, Copeland & Dike
Attys.

Patented May 16, 1933

1,908,692

UNITED STATES PATENT OFFICE

MARTIN F. CONNELL, OF HOLLISTON, MASSACHUSETTS

NONSKID ATTACHMENT FOR AUTOMOBILES

Application filed October 10, 1931. Serial No. 568,020.

This invention relates to a new and useful improvement in a non-skid attachment for automobiles. It is more especially intended for use during a time when there is snow or ice on the ground, but it is also useful when travelling over any surface where there is liability of skidding. Preferably, a plurality of the devices are attached to the wheels at intervals apart between the spokes.

The invention will be more fully understood from the following description when taken in conjunction with the accompanying drawing and the novel features thereof will be clearly pointed out and defined in the claims at the close of this specification.

In the drawing:

Fig. 1 is a fragmentary view of an automobile equipped with devices embodying the invention.

Fig. 2 is an enlarged view of a portion of Fig. 1.

Fig. 3 is a section on line 3—3 of Fig. 2.

Fig. 4 is a sectional view of the device taken on line 4—4 of Fig. 3.

In the drawing, the device is shown as applied to a wood wheel but it is to be understood that it is applicable to wire wheels by slight change in the arms.

Referring to the drawing, there is shown at 10 a felly, at 11 a felly rim, at 12 a demountable tire rim and at 13 a pneumatic tire all of which may be of any well known form of construction. The spokes are shown at 14.

The preferred form of non-skid device embodying the invention is as follows:

Two clamping members A, B preferably of metal, are adjustably connected together and have arms 15, 16 respectively which serve as jaws to embrace the wheel rim and tire rim. The arms 15, 16 have cut out spaces to form respectively cross-over portions 17, 18 which lie side by side and extend in opposite directions.

The cross-over portion 17 of the arm 15 merges into an outwardly bowed portion 19 terminating in an upwardly extending straight portion 21 as viewed in Fig. 3 and the cross-over portion 18 merges into a bowed portion 20 terminating in a straight portion 22. The said portions 21 and 22 respectively are provided with aligned holes through which passes a headed bolt 23 having on its outer end a nut 24. By setting up the nut 24 the arms 15, 16 will be drawn toward each other and cause the arms 15, 16 to tighten their grip on the tire rim and by turning the nut in the reverse direction it permits spreading the arms to loosen their grip on the tire rim. The bolt hole in the arm extension 21 and the portion of the bolt which engages therein are preferably non-circular so that the bolt will not turn on its axis.

A bolt 25 passes through a screw hole in the bowed portion 20 and has a ball and socket connection at 26 with a foot piece 27. The foot 27 has a convex bearing face to engage the concave inner face of the member 19 and permit a rolling movement of the foot on the member 19 as more fully referred to hereinafter. By turning the screw 25 in a direction to cause the foot 27 to push against the member 19 it will cause the members 19, 20 to spread apart and draw the jaw portions of the arms 15, 16 toward each other and cause the jaw portions to grip the wheel rim. The socket connection of the bolt 25 with the foot 27 and the convex face of the foot allow a rolling movement of the foot on the inner face of arm 19. The arms 15, 16 are respectively formed with transverse grooves 8, 9 to engage the side edges of the tire rim 12. In assembling the device with the wheel the bolt 25 should first be rotated in a direction to cause the member 27 to press against the concave inner face of the member 19 and cause the arms 15, 16 to grip the wheel rim; then the bolt 23 should be tightened up to cause the arms to firmly grip the tire rim and retain them in the gripping position. By reason of the curved inner face of the member 19 and the curved face of the member 27 a rolling action is permitted to cause the grip at the points desired.

Preferably, the arms 15, 16 are provided with facings 7 of rubber or other suitable material to prevent defacing the wheel rims. The arm 15 is longer than the arm 16, that is, extends further down than the arm 16 as viewed in Fig. 3, and said arm 15 has a downwardly extending portion 28 formed with longitudinal grooved ways 29, 29 in which is slidably mounted a suitable prong member to prevent skidding on a slippery road. This prong member has a head 30 which is slidable in said grooves 29 and at its outer edge has two blades 31, 32 in planes at an angle to each other, preferably a right angle. It is obvious, however, that the angle between the blades is not necessarily a right angle.

A screw 33 passes through a hole in a bearing block 34 and at its lower end is screwed into the prong head 30. The block 34 is adjustably mounted in the grooved ways 29. The screw 33 has a head 35 which engages the upper end of the block 34 to limit the downward movement of the head 30 and the blades 31 and 32. A coil spring 36 around the screw 33 is under compression and its opposite ends engage respectively the upper end of the head 30 and the lower end of the block 34 to normally cause the blades 31, 32 to extend slightly below the plane of the surface on which the tire travels. The spring will permit the blades to yield when riding over an uneven surface.

Instead of flat blades as shown, any other suitable pointed members may be employed. For convenience I have designated them generally as prong members.

Preferably means are provided whereby the prong members may be retained at an elevation above the surface on which the car is travelling during weather when the device is not needed for non-skid purposes. To this end the block 34 is secured to the blocks 37, 37 which are adjustable longitudinally of the arm 28. The blocks 37, 37 have flanges 38 between which the block 34 is secured by a screw 39.

The blocks 37 are adjustable longitudinally of the extension arm 28. To this end the outer sides of the arm 28 are formed with transverse teeth 40 and the inner faces of the two blocks 37 are formed with teeth 41 adapted to engage in the grooves between the teeth 40. By loosening the screw 39 the blocks 37, 37 may be moved further apart to permit disengagement of their teeth from the teeth 40 of the arm 28 and thus permit readjustment of the blocks 37 upwardly and raise the blades 31, 32. Then the screw 39 may be set up again to secure the blocks 37 in the raised position.

When adjusted to operative position for icy weather or whenever otherwise the ground is slippery, it is preferable to have the blades normally extend about one-half of an inch below the periphery of the tire, but this distance may be varied according to the desire of the user.

When the device is adjusted so that the blades will normally extend down low enough to be operative as a non-skid, the spring 36 will yield when the car is travelling over a level pavement so as not to cause a drag. When it is known that the device will not be needed for non-skid purposes it is preferable to have it locked in the upper position as previously described.

What I claim is:

1. A non-skid attachment for vehicle wheels, comprising two arms adapted to embrace the rim of a wheel, said arms being adjustably secured together at their upper ends to permit the lower portions to be moved into and out of gripping engagement with a wheel rim, means for clamping the said arms to a wheel rim, a prong member, one of said arms having at its lower end a holder for said prong member, said prong member being adjustable up and down in said holder, a spring seat for said prong member which normally causes said prong member to project below the lower end of said holder, said prong holder and the arm to which it is attached having interengaging teeth which permit adjustment of said holder to varying positions of elevation on said arm.

2. A non-skid attachment for a vehicle wheel having a projection adapted to engage the surface on which the vehicle travels, two arms which lie crosswise of each other intermediate their ends, said arms having portions which are adapted to engage the inner face of the felly and having portions adapted to embrace the wheel rim, means to move bodily toward each other the end portions of the arms on the opposite side of the cross-over from the wheel rim, and means to spread further apart the portions of said arms which are intermediate the said arm ends and the cross-over and thereby draw the clamping portions toward each other.

3. A non-skid attachment for a vehicle wheel having a projection adapted to engage the surface on which the vehicle travels, two clamping members which lie crosswise of each other intermediate their ends, said two clamping members having portions adapted to engage the felly and to grip the rim of the wheel, the said two clamping members having arms which extend on the opposite side of the cross-over from the wheel rim, a bolt which passes through the two arms near their ends, means for moving the said bolt axially whereby the said two arms can be drawn toward each other and cause the clamping members to grip the wheel rim, a screw bolt which passes through one of said arms between said cross-over and said first bolt and is thereby operative to spread the intermediate portions of said two arms further apart and cause the clamping portions to be drawn toward each other.

4. A non-skid attachment for a vehicle wheel having two clamping members which lie crosswise of each other, said two members having portions which are adapted to grip the rim of a wheel, the clamping members having arms which are adapted to extend from the cross-over toward the axis of the wheel, a bolt which passes through said arms near their ends and is adapted to be operated to draw said arms and clamping members toward each other to cause the clamping members to grip the wheel rim, said arms being formed intermediate their ends with a portion having a concave inner face, a bolt which passes through one of said concave portions and presses against the concaved portion of the other arm and is operative to spread said arms further apart intermediate their ends and cause the clamping members to grip the wheel rim, one of said clamping members having a skid preventing member which projects below the tread surface of the wheel.

5. A non-skid attachment for a vehicle wheel having two clamping members which lie crosswise of each other, said two members having portions which are adapted to grip the rim of a wheel, the clamping members having arms which are adapted to extend from the cross-over toward the axis of the wheel, a bolt which passes through said arms near their ends and is adapted to be operated to draw said arms and clamping members toward each other to cause the clamping members to grip the wheel rim, said arms being formed intermediate their ends with a concave inner face, a bolt which passes through one of said concave faced portions and has a socket connection with a foot piece having a convex face which presses against the concave surface of the other arm and is operative to spread said arms further apart intermediate their ends and cause the clamping members to grip the wheel rim, one of said clamping members having a skid preventing members which projects below the tread surface of the wheel.

In testimony whereof I affix my signature.

MARTIN F. CONNELL.